United States Patent
Norcross et al.

(10) Patent No.: US 6,412,398 B1
(45) Date of Patent: Jul. 2, 2002

(54) TEMPERATURE SENSING UTENSIL WITH DETACHABLE HEAD

(75) Inventors: Charles Norcross, Lakeclark Shores, FL (US); Arthur Gutterman, Highland Park; Frederick Edmonds, Northbrook, both of IL (US)

(73) Assignee: TruCook, LLC, Skokie, IL (US)

( * ) Notice: Subject to any disclaimer, the term of this patent is extended or adjusted under 35 U.S.C. 154(b) by 0 days.

(21) Appl. No.: 09/521,065

(22) Filed: Mar. 8, 2000

(51) Int. Cl.[7] .............................. A47J 37/00; A47J 43/00
(52) U.S. Cl. ...................... 99/342; 99/419; 99/421 A; 374/155; 294/55.5
(58) Field of Search ............................ 99/342, 343, 344, 99/421 A, 419; 374/155, 147, 208; 294/907, 49, 55.5

(56) References Cited

U.S. PATENT DOCUMENTS

| | | |
|---|---|---|
| 856,768 A | 6/1907 | Comins |
| 1,249,081 A | 12/1917 | Hastad |
| 1,344,344 A | 6/1920 | Howard |
| 1,779,057 A | 10/1930 | Tolmach |
| 1,863,918 A | 6/1932 | Bremer |
| 2,004,659 A | 6/1935 | Groch |
| 2,040,676 A | 5/1936 | Stevens et al. |
| 2,154,426 A | 4/1939 | Adams |
| D123,593 S | 11/1940 | Fischer |
| D162,098 S | 2/1951 | Vacanti |
| 2,594,242 A | 4/1952 | Wilson |
| D168,105 S | 11/1952 | Mitchell et al. |
| 2,638,785 A | 5/1953 | Vacanti et al. |
| 2,682,705 A | 7/1954 | Johnson ........................ 30/324 |
| 2,787,948 A | 4/1957 | Mathis ......................... 99/421 |
| D182,088 S | 2/1958 | Stiens |
| 2,898,845 A | 8/1959 | Dight .......................... 99/421 |
| 3,060,585 A | 10/1962 | Kirk |
| 3,075,454 A | 1/1963 | Henyan ........................ 99/421 |
| 3,140,611 A | 7/1964 | Kliewer ........................ 73/358 |
| 3,270,661 A | 9/1966 | Juvan .......................... 99/343 |
| D207,270 S | 3/1967 | De Bendetto |
| 3,373,611 A | 3/1968 | Trott ........................... 73/352 |
| 3,382,512 A | 5/1968 | Atchley |
| 3,394,593 A | 7/1968 | Aldridge et al. ........... 73/363.9 |
| 3,405,225 A | 10/1968 | McHugh, Jr. ................. 174/52 |
| 3,504,544 A | 4/1970 | Tymkewicz ................... 73/352 |
| 3,552,017 A | 1/1971 | Smuts .......................... 30/322 |
| 3,552,210 A | 1/1971 | Wright, Jr. .................... 72/352 |

(List continued on next page.)

FOREIGN PATENT DOCUMENTS

DE 3636173 5/1988

OTHER PUBLICATIONS

Moeller Instrument Company, Inc., Bulletin No. 55, showing BIMET thermometers, (Date Unknown).
Good Housekeeping, Sep., 1973, p. 194, showing cooking thermometers.

*Primary Examiner*—Reginald L. Alexander
(74) *Attorney, Agent, or Firm*—Dick & Harris

(57) ABSTRACT

A temperature sensing utensil including a handle and a detachable head. The handle includes an engagement region, having an engagement member moveable between locking and release orientations, and a temperature indicating display assembly. The detachable head includes a receiving region having a receiving member and temperature sensing circuitry. The receiving region releasably receives the engagement region such that positioning of the engagement member in a locking orientation relative to the receiving member locks the detachable head onto the handle, while creating an electrical connection between the temperature sensing circuitry and the temperature indicating display circuitry. However, positioning of the engagement member in a release orientation permits detachment of the head from the handle, and disconnection of the electrical circuit. The temperature sensing utensil may take the form of a fork, spoon, probe or other utensil.

21 Claims, 3 Drawing Sheets

U.S. PATENT DOCUMENTS

| | | | | |
|---|---|---|---|---|
| 3,651,405 | A | 3/1972 | Whitney et al. | 325/113 |
| D227,294 | S | 6/1973 | Maynard | |
| 3,736,861 | A | 6/1973 | Kroyer et al. | 99/343 |
| 3,742,840 | A | 7/1973 | Cogswell | 99/421 |
| D228,337 | S | 9/1973 | Maynard | |
| 3,778,798 | A | 12/1973 | Heit | 340/228 |
| 3,967,502 | A | 7/1976 | Moran | 73/352 |
| 4,058,013 | A | 11/1977 | Trott | 73/352 |
| 4,083,250 | A | 4/1978 | Goff et al. | 73/352 |
| 4,089,222 | A | 5/1978 | Perkins | 73/352 |
| 4,156,365 | A | 5/1979 | Heinmets et al. | 73/343 |
| 4,182,313 | A | 1/1980 | Aslan | 128/736 |
| 4,325,187 | A | 4/1982 | Wasson | 30/327 |
| D268,333 | S | 3/1983 | Kojima et al. | D10/57 |
| 4,428,685 | A | 1/1984 | Lemelson et al. | 374/163 |
| 4,479,026 | A | 10/1984 | Brixy et al. | 136/232 |
| 4,509,868 | A | 4/1985 | Ronconi et al. | 374/141 |
| 4,580,909 | A | 4/1986 | McIntosh | 374/141 |
| 4,599,797 | A | 7/1986 | Bax | 30/323 |
| 4,601,589 | A | 7/1986 | Meisner | 374/208 |
| 4,644,481 | A | 2/1987 | Wada | 364/557 |
| 4,667,407 | A | 5/1987 | Grise | 30/148 |
| 4,763,112 | A | 8/1988 | Hsieh | 340/573 |
| D298,219 | S | 10/1988 | Muller | D10/57 |
| 4,813,790 | A | 3/1989 | Frankel et al. | 374/208 |
| 4,962,765 | A * | 10/1990 | Kung et al. | 374/155 X |
| RE33,431 | E | 11/1990 | Sartori | 15/144 R |
| 5,018,875 | A | 5/1991 | Cook | 374/208 |
| 5,044,265 | A | 9/1991 | Janssen | 99/418 |
| 5,154,114 | A | 10/1992 | Chang | 99/340 |
| 5,160,197 | A | 11/1992 | Klose | 374/147 |
| 5,213,028 | A | 5/1993 | Chang | 99/340 |
| D343,678 | S | 1/1994 | Snoke et al. | D24/112 |
| 5,299,356 | A | 4/1994 | Maxwell, III | 30/322 |
| 5,349,573 | A | 9/1994 | Hiromori | 368/108 |
| 5,399,018 | A | 3/1995 | Hollander et al. | 374/121 |
| 5,421,089 | A | 6/1995 | Dubus et al. | 30/142 |
| 5,441,344 | A | 8/1995 | Cook, III | 374/141 |
| 5,479,708 | A | 1/1996 | Thomas | 30/122 |
| 5,575,563 | A | 11/1996 | Chiu et al. | 374/141 |
| 5,592,744 | A | 1/1997 | Weinstein | 30/324 |
| 5,603,163 | A | 2/1997 | Ikner, Jr. | 30/324 |
| 5,620,255 | A | 4/1997 | Cook, III | 374/141 |
| 5,626,425 | A | 5/1997 | Fujikawa et al. | 374/163 |
| D379,936 | S | 6/1997 | Wei-Hsin | D10/57 |
| 5,634,719 | A | 6/1997 | La Neve | 374/141 |
| D385,203 | S | 10/1997 | Zappa | D10/57 |
| D385,499 | S | 10/1997 | Weiss | D10/57 |
| 5,678,925 | A | 10/1997 | Garmaise et al. | 374/157 |
| 5,699,614 | A | 12/1997 | Garneau, Sr. | 30/142 |
| 5,820,263 | A | 10/1998 | Ciobanu | 374/111 |
| 5,829,878 | A | 11/1998 | Weiss et al. | 374/163 |
| D405,705 | S | 2/1999 | Norcross | D10/57 |
| 5,892,448 | A | 4/1999 | Fujikawa et al. | 340/584 |
| D412,126 | S | 7/1999 | Aquilina | D10/57 |
| 5,923,258 | A | 7/1999 | Tseng | 340/584 |
| 5,924,816 | A | 7/1999 | Schuele | 403/371 |
| 5,933,918 | A | 8/1999 | Wallays | 16/114 R |
| 5,934,181 | A | 8/1999 | Adamczewski | 99/342 |
| D416,209 | S | 11/1999 | Norcross et al. | D10/57 |
| 6,000,845 | A * | 12/1999 | Tymkewicz et al. | 374/155 |
| 6,015,232 | A | 1/2000 | Hay et al. | 374/138 |
| 6,065,391 | A * | 5/2000 | Archard et al. | 99/342 |

* cited by examiner

TEMPERATURE SENSING UTENSIL WITH DETACHABLE HEAD

BACKGROUND OF THE INVENTION

1. Field of the Invention

The present invention relates in general to temperature sensing utensils for cooking food, and more particularly, to a temperature sensing utensil with a detachable head.

2. Background Art

Cooking utensils and thermometers having detachable and interchangeable heads or implements have been known in the art for several years. In particular, many of these devices include a handle and several heads and/or implements which may be interchangeably attached to and detached from the handle. These devices range in use from kitchen utensils, to utensils for infants, to thermometers. For instance, Thomas, U.S. Pat. No. 5,479,708, discloses a utensil holder for infants and toddlers that this made up of a generally triangular handle and a utensil head. The handle includes a gripping area and a hollow socket which receives a selected utensil head. The utensil head, in turn, includes a tapered shank with a protuberance which fits inside the hollow socket. The hollow socket further includes a depression for receiving the protuberance on the tapered shank. The utensil head, and more particularly, the tapered shank, may be forced into the hollow socket of the handle such that the protuberance fits into the depression in the socket, thus locking the utensil head into place. The utensil head may be forcibly removed from the handle for interchangeability purposes.

While Thomas discloses a handle with a separate detachable utensil head, there is no electrical connection between the detachable utensil head and the handle. Moreover, while the protuberance on the shank of the head and the depression in the hollow socket of the handle facilitates locking of the utensil head to the handle, such an engagement may be disrupted by simply pulling the handle away from the detachable head. A secure lock is not achieved.

Another example, Chiu et al., U.S. Pat. No. 5,575,563, discloses a thermometer having a main body portion capable of accepting a number of different temperature sensing end portions. The main body portion has a receiving region including two female electrical connection sockets, while the sensing end portion has an engaging member including a small detent and two male electrical prongs. The engaging region on the sensing end fits into the receiving region of the main body, and is held in place by the electrical connection between the male prongs and the female receiving sockets, as well as by the mating engagement of the small detent with a depression inside of the handle.

However, to secure the connection between the main body and the sensing end, Chiu et al. relies primarily on the connection of the electrical prongs with the electrical connection ports. While a detent is also disposed on the sensing portion, that detent appears to provide very little locking support, thus allowing inadvertent release of the temperature sensing portion from the main body during use. This fit is especially troublesome in the context of cooking food, wherein the temperature sensing head is ruggedly inserted into and pulled out of various food items. Detachment of the sensing portion or head from the handle can be detrimental in cooking food as detachment of the head from the handle eliminates the electrical connection, and prevents a user from obtaining a proper read-out of food doneness—an undesirable result in cooking meats or other food items which may contain harmful bacteria.

In yet another example, Wallays, U.S. Pat. No. 5,933,918, discloses a kitchen utensil comprising a handle and a series of detachable implements. The handle comprises an inner chamber with a pair a concave seats or recesses, and an inner recessed portion. Each concave seat includes an aperture. The detachable implements each include a mounting portion which comprises a shoulder, a central stem, a head and locking legs. The locking legs further include a protuberance on their respective ends for operable engagement with the apertures in the handle recesses. Further, the locking legs are flexible and may be depressed inwardly to engage and secure the detachable implement into the handle.

Although Wallays discloses a handle with a receiving region which includes apertures to accept specific detents or protuberances on the engaging region of a detachable implement, Wallays does not contemplate an electrical connection. Thus, the engaging and receiving regions of Wallays were not designed to accommodate a secure, tight electrical connection in a cooking utensil with a detachable head which is dishwasher safe. This is particularly evident as the engaging region and depressible detents are positioned on the detachable implement portion. Inasmuch as the depressible detents rely on the resiliency for securing and detaching the detachable implement relative to the handle, repeated hot and cold washing cycles in the dishwasher can render the hard plastic material brittle.

Thus, while these and other prior art devices have presumably worked suitably for their specific applications, none are suited for the present contemplated application. Accordingly, there remains a need for a temperature sensing utensil having a detachable head which is dishwasher safe for removal of potentially harmful bacteria found in meats and other items to be cooked. There remains a further need for temperature sensing utensil with a detachable head which is adapted for use in temperature sensing cooking applications, and wherein the temperature sensing head may be locked to and detached from the temperature indicating handle portion to create an electrical connection.

These and other desirable characteristics of the present invention will become apparent in light of the present specification (including claims) and drawings.

SUMMARY OF THE INVENTION

The present invention is directed to a temperature sensing utensil including a handle and a detachable head.

The handle preferably includes an engagement region, having an engagement member moveable between locking and release orientations, and a temperature indicating display assembly. In a preferred embodiment, the engagement member comprises a pair of detents operably retained in the engagement region. The detents preferably include a base portion and a contact portion, and are preferably positionable in apertures in the walls of the engagement region.

In one embodiment, the base and contact portions of the detents are separated by a gap, thus allowing movement of the contact portion relative to the base. The gap lends resiliency to the detents such that the contact portion returns to its initial, outward locking orientation when pushed forward relative to the base.

In another embodiment, a spring is positioned between the detents in the engagement region. The spring biases the detents to an outward locking orienation.

Preferably, the contact portion of the detents is ramp shaped to facilitate attachment and locking of the detachable head onto the handle.

The temperature indicating display assembly preferably includes a display, a display circuit, electrical conduits, a power source and female electrical connection ports. In one embodiment, the display comprises a series of windows which cover LED displays corresponding to various temperature settings or doneness levels. In another embodiment, the display comprises a digital temperature readout. In yet another embodiment, the display may comprise an audible output, in the form of voice generation or an alarm.

The detachable head includes a receiving region having a receiving member and temperature sensing circuitry. In one embodiment, the receiving member comprises windows positioned in opposing walls of the receiving region. The windows are preferably of a size and shape to accept the engagement member, for instance the detents.

The temperature sensing circuitry preferably comprises a temperature sensing member, such as a thermocouple, positioned in one of the fork tines. The temperature sensing member is preferably connected to male connecting prongs by an electrical conduit. Insertion of the male connecting prongs into the female ports creates an electrical connection between the temperature sensing assembly and the temperature indicating display assembly.

In a preferred embodiment, the engagement region further includes engagement keys, while the receiving region includes engagement slots. The engagement keys and slots ensure that the detachable head is placed onto the handle in a proper mechanical and electrical orientation. In particular, the engagement keys and slots control proper orientation of the receiving region relative to the engagement region, which, in turn, ensures maintenance of the electrical circuit between the temperature sensing assembly and the temperature indicating display assembly, thus preserving uniform polarity.

The receiving region preferably releasably receives the engagement region such that positioning of the engagement member in a locking orientation relative to the receiving member locks the detachable head onto the handle, and thus initiating an electrical connection between the temperature sensing circuitry and the temperature indicating display circuitry. However, positioning of the engagement member in a release orientation permits detachment of the head from the handle, and disconnection of the electrical circuit.

The temperature sensing utensil may take the form of a fork, spoon, probe or other utensil. Further, the detachable head may include any number of tines, or no tines at all.

DETAILED DESCRIPTION OF THE INVENTION

Figure 2:
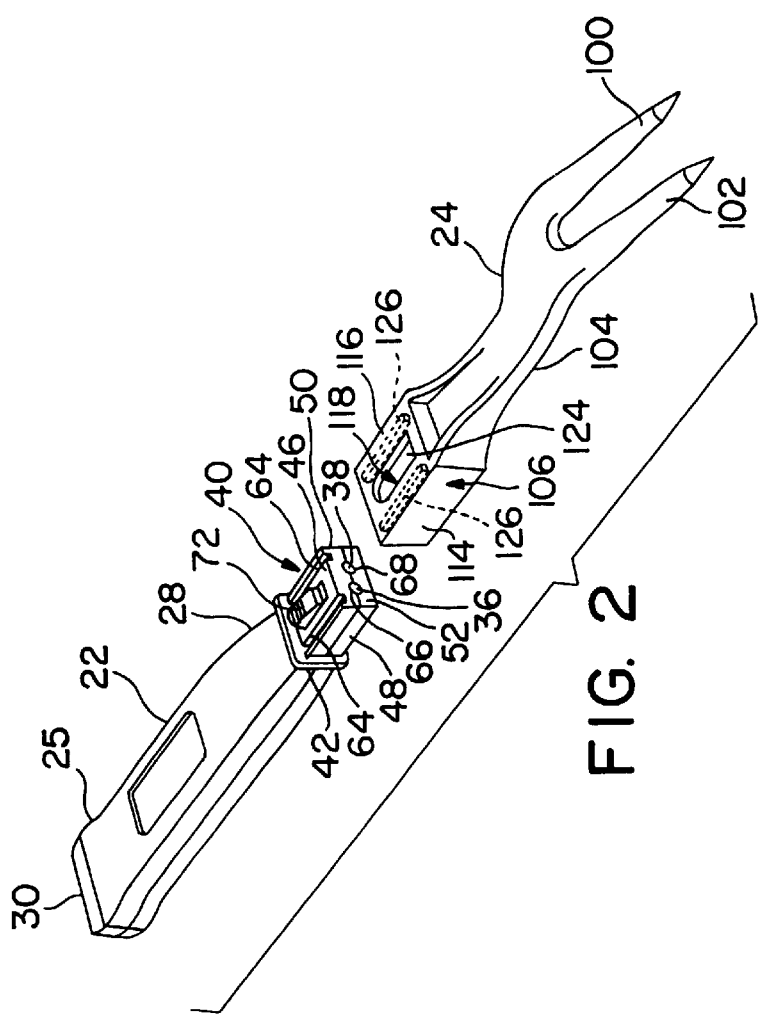
FIG. 2 is an exploded perspective view of the temperature sensing utensil shown in FIG. 1.

While this invention is susceptible of embodiment in many different forms, there are shown in the drawings and will herein be described in detail, two specific embodiments with the understanding that the present disclose is to be considered as an exemplification of the principals of the invention and is not intended to limit the invention to the embodiments illustrated.

Temperature sensing utensil 20 is shown in FIGS. 1–9 as comprising handle 22 and detachable head 24. At the outset, while temperature sensing utensil 20 is shown in the drawings as comprising a temperature sensing fork, it is likewise contemplated that the temperature sensing utensil may comprise any kitchen implement, such as a spoon, knife or other utensil. Alternatively, temperature sensing utensil 20 may comprise other devices which sense the temperature of food. To this end, while detachable head 24 is shown as comprising a fork head including two tines with pointed tips, it is likewise contemplated that detachable head 24 may include a single pointed or piercing tip, or any number of pointed tips. However, for purpose of the present application, temperature sensing utensil 20 will be described in relation to a handle having detachable fork tines. Throughout this detailed description, like reference numerals will be used to designate like parts.

Temperature sensing utensil 20 is preferably constructed from a resilient, hard material such as plastic. Such a construction makes the utensil lightweight and durable. However, it is likewise contemplated that portions, or the entirety, of temperature sensing utensil 20 may be constructed of various metals for increased strength. Further, both handle 22 and head 24 are constructed from two primary pieces which can be attached together chemically, such as by adhesive, or mechanically, such as by screws or the like. Of course, inasmuch as head 24 is detachable from handle 22, the head and handle may be constructed differently. In particular, inasmuch as handle 22 houses the temperature display circuitry, which may need repair or replacing, handle is preferably held together with screws. However, inasmuch as detachable head 24 is preferably dishwasher safe, the head is preferably formed as an integrated single unit—so as so prevent and/or minimize the entry of water or other dishwashing substances into detachable head 24. As will be described below, detachable head 24 includes a temperature sensing assembly, including a thermocouple, which preferably remains dry. Of course, those of ordinary skill in the art with the present disclosure before them will likewise recognize that temperature sensing utensil 20 may be constructed of a single, unitary construction, or, alternatively, may be constructed from yet even additional component pieces.

Handle 22, shown in FIGS. 1–5, includes top end 25, temperature indicating display assembly 26 and bottom end 28. Top end 25 further includes cap 30, which may be removed from handle 22. Handle 22 is preferably hollow, so as to house not only temperature indicating display 26, but also a power source, such as batteries, which powers temperature sensing utensil 20. While not shown in the drawings, batteries are preferably inserted in top 25 of handle 22 after cap 30 is removed.

Figure 1:
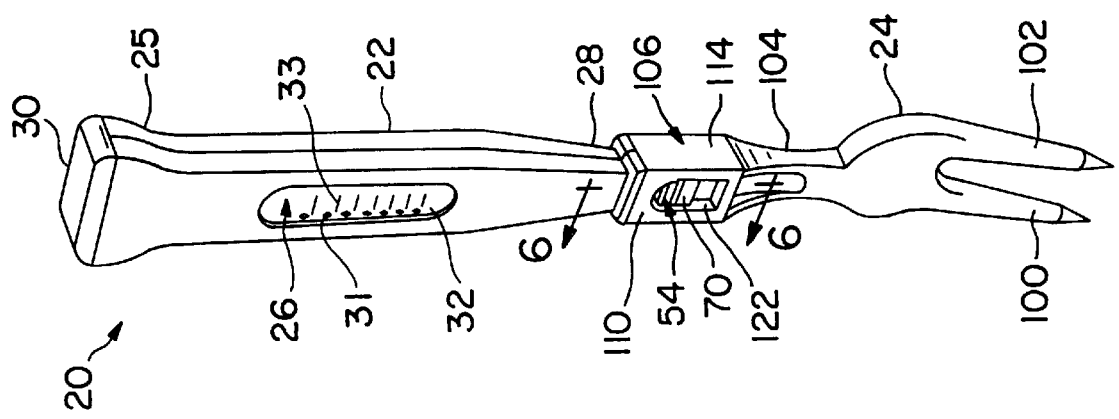
FIG. 1 is a perspective view of a temperature sensing utensil according to the present invention.
Figure 3:
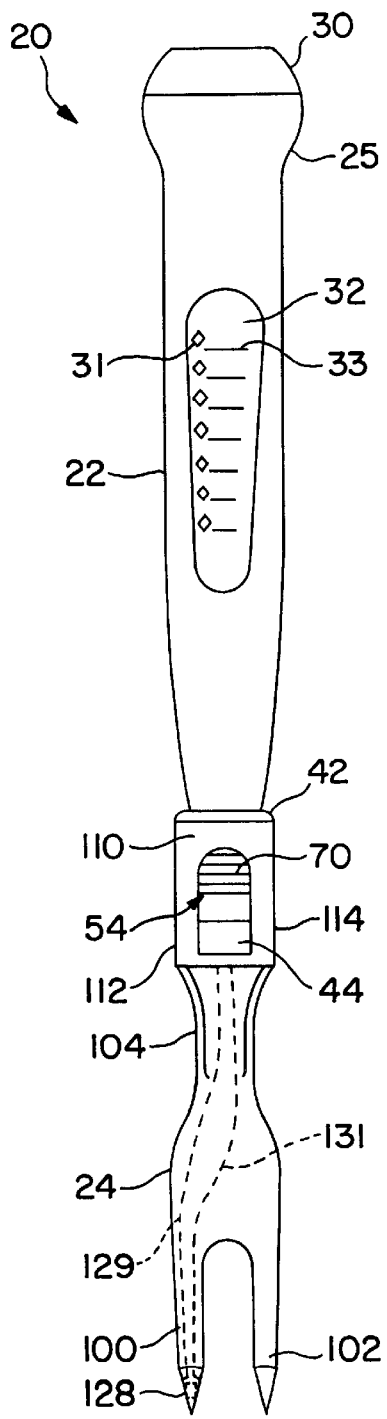
FIG. 3 is a front elevational view of the temperature sensing utensil shown in FIG. 1.
Figure 4:
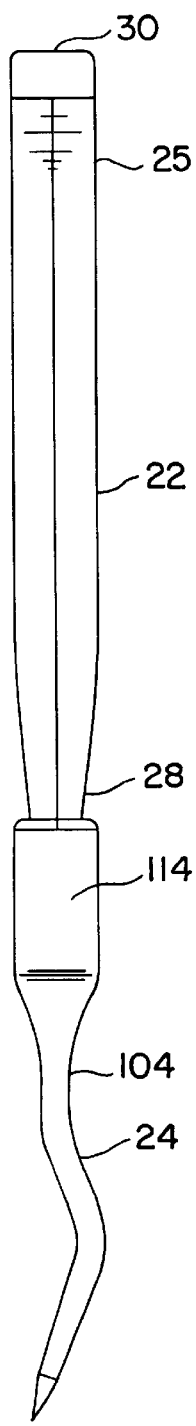
FIG. 4 is a side elevational view of the temperature sensing utensil shown in FIG. 1.
Figure 5:
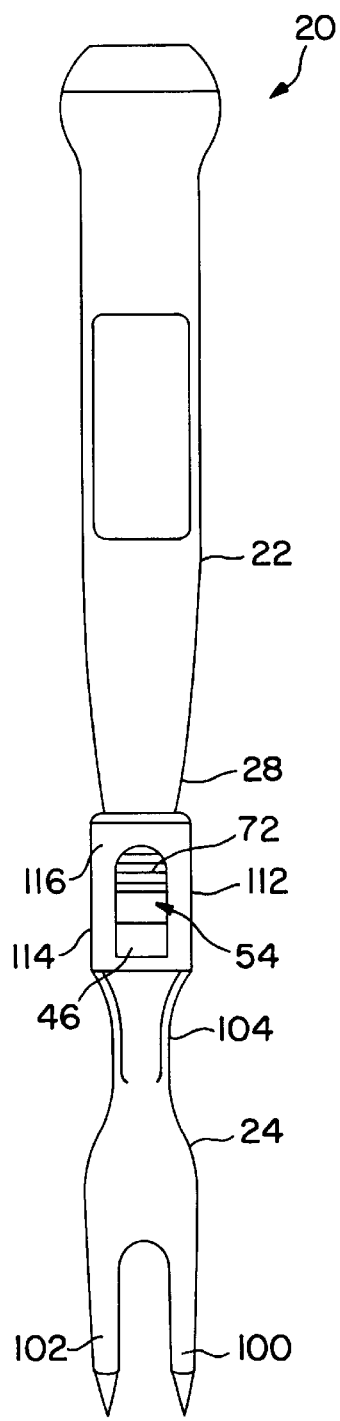
FIG. 5 is a rear elevational view of the temperature sensing utensil shown in FIG. 1.
Figure 6:
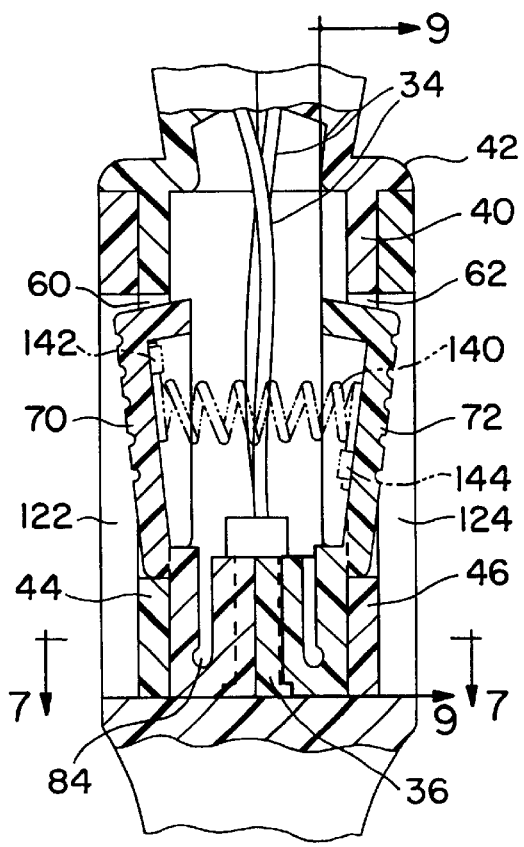
FIG. 6 is a side elevational view shown in cross-section of the temperature sensing utensil taken along lines 6—6 of FIG. 1 and looking in the direction of the arrows.

Temperature indicating display 26 is shown in FIGS. 1, 3 and 6 as including display 32, display circuit (not shown), electrical conduits 34, and electrical connection ports 36 and 38. Display 32 is shown in the drawings as comprising a series of windows 31 which cover LED displays corresponding to various temperature settings 33, which may vary according to application of temperature sensing utensil 20. For instance, in one application, settings 33 may indicate doneness levels for various meats and other food items, ranging from very rare to well done. Each doneness setting corresponds to a range of food temperatures which are sensed by head 24. However, it is also contemplated that display 32 may comprise a digital temperature display. Likewise, a speaker may be connected to a voice activation module or sound module for audible temperature output.

Figure 7:
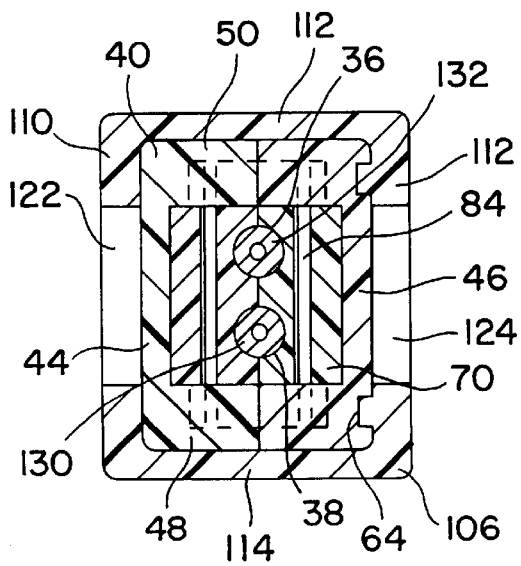
FIG. 7 is a top plan view shown in cross-section of the temperature sensing utensil taken along lines 7—7 of FIG. 6 and looking in the direction of the arrows.

The display circuit preferably converts a signal received from temperature sensing assembly 108 in detachable head 24 to a desired output form for display 32. As is shown in FIGS. 6 and 7 and discussed in more detail below, when electrically connected to male electrical prongs 130 and 132 on head 24, female electrical connection ports 36 and 38 transmit the temperature signal through electrical conduits 34 to the display circuit for conversion to a desired output format.

Bottom end 28 of handle 22 includes engagement region 40, shown in FIGS. 1–9 as comprising shoulder 42, front face 44, back face 46, side faces 48 and 50, bottom face 52, engagement member 54, and inner detent retention structure 56. Shoulder 42 acts as a stop for detachable head 24 when it is attached to engagement region 40 of handle 22. In particular, shoulder 42 ensures proper placement of detachable head 24, and prevents detachable head 24 from exceeding proper its proper location relative to engagement region 40. Front face 44 and back face 46 include apertures 60 and 62, respectively. As will be described below, apertures 60 and 62 permit movement of engagement member 54, and more particularly detents 70 and 72, between locking and release orientations.

Back face 46 further includes engagement slots 64. Engagement slots 64 are of a dimension to cooperate with engagement keys 126 on receiving region 106 of detachable head 24, as will be described below. Bottom face 52 further includes apertures 66 and 68, which house female electrical connection ports 36 and 38.

Engagement member 54 is shown in FIGS. 1–9 as comprising detents 70 and 72. Inasmuch as detents 70 and 72 are identical components, only detent 70 will be described in detail. Detent 70, shown in FIGS. 6–9, comprises base 74 and contact portion 76. Base 74 includes wings 78 and 79, semi-circular channels 80 and 82, and slot 84. Wings 78 and 79 are configured to fit into inner detent retention structure 56, described below. Moreover, semi-circular channels 80 and 82 combine with the semicircular channels of detent 72 to form channels which house electrical connection ports 36 and 38. In particular, upon construction of temperature sensing utensil 20, the two opposing handle pieces, preferably substantially mirror images of each other, are secured to form the channels to house female electrical connection ports 36 and 38.

Figure 8:
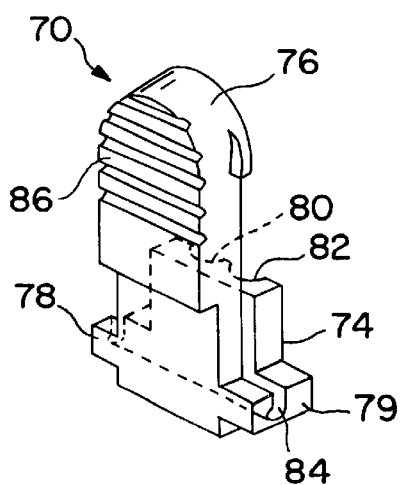
FIG. 8 is a perspective view of a detent segment according to the present invention.

As is shown in FIG. 8, slot 84 separates at least a portion of base 74 from at least a portion of contact portion 76. This separation permits contact portion 76 to move toward and away from base 74. However, inasmuch as contact portion 76 is connected to base 74, contact portion 76 preferably resiliently returns to its original position relative to base 74 after movement toward or away from the base. This resiliency allows contact portion 76 to be moved between locking and release orientations when detents 70 and 72 are placed in inner detent retention structure 56 in engagement region 40. The movement capability of engagement member 54 permits engagement region 40 to be securely locked into receiving region 106 on detachable head 24.

Figure 9:
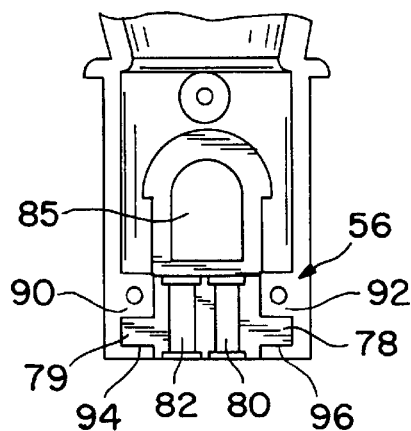
FIG. 9 is a fragmentary front elevational view shown in cross-section of the engagement region of the temperature sensing utensil taken along lines 9—9 of FIG. 1 and looking in the direction of the arrows.

As can be seen in FIGS. 8 and 9, contact portion 76 preferably includes a hollow portion 85 and contact face 86. Contact face 86, in turn, preferably includes a gripping surface, shown in the figures as a series of ridges and grooves, to help a user feel when he or she has contacted detents 70 and 72, as well as to facilitate movement of detents 70 and 72 between locking and release orientations. Inasmuch as temperature sensing utensil 20 is often used outside on a barbecue grill at night time and/or in the dark, the tactile gripping surface allows a user to blindly detach and reattach detachable head onto the handle 22. Moreover, while contact face 86 is as shown as including ridges and grooves, other gripping surfaces such as depressions, dimples, protrubulances, etc. are likewise contemplated for use in the present invention.

Inner detent retention structure 56, shown in FIG. 9, includes opposing shoulders 90 and 92, and wing slots 94 and 96. Wing slots 94 and 96 accept wings 78 and 79 on detent base 74, for a secured friction fit of detents 70 and 72 in inner detent retention structure 56. While an adhesive or chemical compound may be used to permanently secure detents 70 and 72 in inner retention structure 56, a friction fit is preferred to allow disassembly of temperature sensing utensil 20 and replacement of detents 70 and 72, if necessary. Notably, each half of handle engagement region 40 includes an inner detent retention structure, so as to house both detents 70 and 72.

Moreover, contact portion 76 of detents 70 and 72 is preferably ramped or angled from bottom to top so as to protrude from front and back face apertures 60 and 62, respectively, when the detents are positioned in engagement region 40. Such a construction allows a user to better feel the upper ramped portion of contact portion 76 through receiving region windows 122 and 124, as is described below. More importantly, a ramped detent structure securely locks detachable head 24 onto engagement region 40 of handle 22, while at the same time facilitating placement of detachable head 24 onto handle 22, also described below.

Inasmuch as detent segments 70 and 72 are preferably brought into contact when temperature sensing utensil handle 22 is constructed, detents 70 and 72 are locked into place at least partially inside engagement region 40. Secured in engagement region 40, the respective base portions of detents 70 and 72 are substantially locked into place. However, despite the substantial locking of the base portions, slots 84 permit the respective contact portions of detents 70 and 72 to move relative to the base portions in and out of apertures 60 and 62 in front 44 and back 46 faces of engagement region 40.

Detachable head 24 is shown in FIGS. 1–7 as comprising tines 100 and 102, neck 104, receiving region 106 and temperature sensing assembly 108. Tines 100 and 102 preferably include food piercing tips for penetration into food and subsequent temperature measurements. As is shown in phantom in FIG. 3, one of the tines includes a temperature sensing thermocouple 128 with leads 129 and 131 extending therefrom, for measuring the temperature of food.

Receiving region 106 comprises front wall 110, opposing sidewalls 112 and 114, back wall 116, retaining region 118 and floor 120. Both front wall 110 and back wall 116 include windows 122 and 124, respectively, for receiving engagement member 54 on engagement region 40. Specifically, when engagement region 40 comprises detents 70 and 72, windows 122 and 124 each accept a detent for securing and locking detachable head 24 to handle 22.

Back wall 116 further includes engagement keys 126 positioned on the inner face of the back wall. Keys 126 preferable slide within engagement slots 64 in engagement region 40. The mating engagement of keys 126 with slots 64 helps to not only prevent rotational or lateral movement of detachable head 24 relative to handle 22 when in a secured, locking orientation, but also to assure a user that detachable head 24 is oriented properly relative to handle 22. Proper orientation of detachable head 24 on handle 22 is essential to ensure electrical connection between temperature sensing assembly 108 in detachable head 24 to temperature indicating display assembly 26 in handle 22. In particular, the correct male electrical prong 130 or 132 must be placed within the proper female electrical connection port 36 and 38 to ensure proper electric polarity. Moreover, as discussed, the temperature sensing utensil of the present invention is often used in the dark when barbecuing outdoors. Engagement keys 126 prevent detachable head 24 from being place on handle 22 in an improper electrical orientation. Thus, a user is precluded from attempting to use the fork in an electrically non-operative orientation, in turn precluding an improper or unresponsive reading on the temperature display for cooking purposes.

Temperature sensing assembly 108 comprises thermocouple 128, leads 129 and 131, and male electrical prongs 130 and 132. Thermocouple 128, shown in phantom in FIG. 3, is preferably positioned in right hand tine 100. However, it is likewise contemplated that thermocouple may be placed in left hand tine 102, or in any other tine if additional tines are used. Thermocouple 128 senses the temperature of a food item upon insertion of tines 100 and 102 into that item. A sensed temperature signal is transmitted from thermocouple 128, through leads 129 and 131, to male electrical connecting prongs 130 and 132, which preferably emanate from floor 120 of receiving region 106. As described above, prongs 130 and 132 fit into electrical connection ports 36 and 38 in engagement region 40. Preferably, the seal between prongs 130 and 132 and floor 120 is water tight, so as to prevent seepage or leakage of water into detachable head 24 during dishwashing or other cleaning. Such entry of water into detachable head may adversely affect performance and/or accuracy of thermocouple 128, as well as the accuracy of the general temperature sensing mechanism employed by the present invention.

As is shown in FIG. 6, detents 70 and 72 may likewise be biased outwardly in a locking orientation by spring 140. Spring 140 preferably extends between the inner surfaces of detents 70 and 72, preferably in the hollow portion 85 of each detent. While springs are shown as held in place by retaining structures 142 and 144, any retaining structure may likewise be used in combination with the detents 70 and 72 as would be known by those of ordinary skill in the art with the present disclosure before them. For instance, detents 70 and 72 may be equipped with sockets on their inside faces to receive spring 140. Of course, spring 140 may be used either alone or in combination with the existing detent structure.

Notably, in this particular embodiment, spring 140 and engagement region 40 are associated with handle 22. In particular, handle 22 cannot be subjected to dishwasher cleaning because of the temperature indicating display circuitry contained therein, including a power source preferably in the form of batteries. Simply stated, water may short the temperature indicating display circuit. Thus, spring 140 is preferably positioned in the portion of temperature sensing utensil 20 which is not intended for cleaning in a dishwasher. Indeed, subjecting spring 140 to the continual heating and cooling cycles in a dishwasher, rusts, erodes and weakens the spring, thus rendering the spring less effective or even non-functional.

To assemble temperature sensing utensil 20, receiving region 106 of detachable head 24 is positioned over engagement region 40 of handle 22. Notably, a proper electrical connection between the detachable head and the handle is ensured as receiving region 106 will not slide over engagement region 40 if engagement keys 126 on the inner surface of back wall 116 of receiving region 106 are not aligned with engagement slots 64 in back face 46 of engagement region 40. Because contact portions 76 of detents 70 and 72 are preferably ramped or sloped, receiving region 106 simply depresses engagement member 54, namely, detents 70 and 72, downward against the detent bias to a release orientation. Inasmuch as detents 70 and 72 each include slot 84, thus lending resiliency to the detents, detent contact portions 76 may be depressed toward detent base portions 74 while maintaining the integrity and structure of the detents—without breaking or substantially weakening same. Of course, if spring 140 is used, detents are simply depressed toward one another against the spring bias toward a release orientation.

When receiving region 106 abuts shoulder 42 of engagement region 40, detents 70 and 72 preferably align with windows 122 and 124 in receiving region 106. At this point in time, detents 70 and 72 return back to their original locking orientation, as they are biased to the locking orientation by either the resiliency of the detent material, a spring placed between the detents and/or other biasing mechanism. In the locking orientation, detents 70 and 72 preclude detachment of detachable head 24 from handle 22, thus locking detachable head 24 onto handle 22 for use of temperature sensing utensil 20. In particular, the upper ramped portion of the detent contact portions 76 abut the inside face of the portion of receiving region 106 defining windows 122 and 124, thus precluding movement of the receiving region relative to the engagement region. Of course, in this locking orientation, male electrical connecting prongs 130 and 132 are inserted into female electrical connection ports 36 and 38 to electrically connect temperature sensing assembly 108 in detachable head 24 to temperature indicating display assembly 26 in handle 22.

To detach head 24 from handle 22, engagement member 54, and more particularly detents 70 and 72, are depressed against their outward locking orientation bias toward a release orientation, thus permitting a user to pull receiving region 106 off of engagement region 40. Detachable head 24, upon detachment from handle 22, may be cleansed in a dishwasher to destroy any bacteria from food contacted by tines 100 and 102. Inasmuch as the engagement region 40 is positioned on handle 22, engagement member 54, and more particularly detents 70 and 72, are never subjected to the hot and cold cycles of dishwasher cleaning which may render the preferably plastic detents brittle and weak—thus destroying the ability of the detents to freely move between locking and release orientations. Indeed, repeated dishwashing may even result in breaking of the detents during attachment of head 24 to and detachment of head 24 from handle 22.

Moreover the engagement structure contemplated by the present invention permits easy attachment of detachable head 24 to handle 22 without the exertion of substantial force. Further, when attached, detachable head 24 is securely locked on handle 22, with no opportunity to release during use. At the same time, engagement member 54 permits detachable head 24 to be released from handle 22 without the exertion of substantial force, provided that engagement member is moved to the release orientation.

The foregoing description and drawings merely explain and illustrate the invention and the invention is not limited thereto except insofar as the appended claims are limited as those skilled in the art who have the present disclosure before them will be able to make modifications and variations without departing from the scope of the invention.

What is claimed is:

1. A utensil for sensing the temperature of food comprising:
   - a handle including an engagement region and a temperature indicating display assembly,
   - said engagement region having at least one engagement member operably moveable between locking and release orientations; and
   - a head which includes a food utensil member, having at least two food piercing locations, said food utensil member being capable of penetrating food from each of said at least two food piercing locations simultaneously, for manipulating said food from at least two spaced apart positions on said food utensil member, and which is both attachable to and detachable from the handle, said head including a receiving region and a temperature sensing assembly, said temperature sensing assembly being operably and electrically attachable to said temperature indicating display assembly associated with said handle,
   - said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit.

2. The temperature sensing utensil according to claim 1 wherein said engagement member includes at least one detent operably moveable between said locking and release orientations.

3. The temperature sensing utensil according to claim 2 wherein said at least one detent includes at least a base portion and a contact portion.

4. The temperature sensing utensil according to claim 2 wherein said engagement member comprises at least two detents, each detent operably moveable between respective locking and release orientations.

5. The temperature sensing utensil according to claim 1 wherein secured attachment of said engagement region to said receiving region electrically couples said temperature indicating display assembly to said temperature sensing assembly to connect said electrical circuit, said electrical circuit further including:
   - an electrical power source and an electrical conduit within said handle, and
   - an electrical conduit and an temperature sensor in said head, said electrical conduit in said handle being electrically connected to said electrical conduit in said head through male electrical connectors and female electrical connectors which respectively, releasably, receive one another to connect said circuit when said head is positioned on said handle in said locking orientation.

6. The temperature sensing utensil according to claim 1 wherein said temperature indicating display assembly includes an display circuit which converts a temperature signal from said temperature sensing assembly to temperature indicating output.

7. The temperature sensing utensil according to claim 1 wherein said head is dishwasher safe.

8. A utensil for sensing the temperature of food comprising:
   - a handle including an engagement region and a temperature indicating display assembly,
   - said engagement region having at least one engagement member operably moveable between locking and release orientations; and
   - a head which is both attachable to and detachable from the handle, said head including a receiving region and a temperature sensing assembly, said temperature sensing assembly being operably and electrically attachable to said temperature indicating display assembly associated with said handle,
   - said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit,
   - said engagement member including at least one detent operably moveable between said locking and release orientations,
   - said at least one detent being depressible for movement from said locking orientation to said release orientation.

9. A utensil for sensing the temperature of food comprising:
   - a handle including an engagement region and a temperature indicating display assembly,
   - said engagement region having at least one engagement member operably moveable between locking and release orientations; and
   - a head which is both attachable to and detachable from the handle, said head including a receiving region and a temperature sensing assembly, said temperature sensing assembly being operably and electrically attachable to said temperature indicating display assembly associated with said handle,
   - said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit,
   - said engagement member including at least one detent operably moveable between said locking and release orientations,
   - said at least one detent biased to said locking orientation.

10. The temperature sensing utensil according to claim 9 wherein said at least one detent is constructed from a resilient material such that said at least one detent returns to said locking orientation after movement of said at least one detent from said locking orientation to said release orientation.

11. The temperature sensing utensil according to claim 9 wherein said at least one detent is biased to a locking orientation by a spring positioned within said engagement region.

12. A utensil for sensing the temperature of food comprising:

a handle including an engagement region and a temperature indicating display assembly, said engagement region having at least one engagement member operably moveable between locking and release orientations; and a head which is both attachable to and detachable from the handle, said head including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit, said engagement member including at least one detent operably moveable between said locking and release orientations, said at least one detent including at least a base portion and a contact portion, at least a portion of said base portion being separated by a gap from at least a portion of said contact portion to allow movement of said contact portion relative to said base portion.

13. The temperature sensing utensil according to claim 12 wherein at least a portion of said at least one detent is housed within said engagement region in said handle.

14. The temperature sensing utensil according to claim 12 wherein at least a portion of said base potion is securely restrained within said engagement region, and wherein at least a portion of said contact portion is moveable relative to said engagement region.

15. A utensil for sensing the temperature of food comprising:

a handle including an engagement region and a temperature indicating display assembly, said engagement region having at least one engagement member operably moveable between locking and release orientations; and a head which is both attachable to and detachable from the handle, said head including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit, said engagement member comprising at least two detents, each detent operably moveable between respective locking and release orientations, said engagement region further including opposing front and back faces and opposing side faces, and wherein said at least two detents are positioned in at least two of said opposing faces.

16. A utensil for sensing the temperature of food comprising:

a handle including an engagement region and a temperature indicating display assembly, said engagement region having at least one engagement member operably moveable between locking and release orientations; and a head which is both attachable to and detachable from the handle, said head including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit, said receiving member including at least two opposing walls defining a retaining region, at least one of said at least two opposing walls including at least one aperture alignable, in said locking orientation, with a respective one of said engagement members.

17. The temperature sensing utensil according to claim 16 wherein said at least one aperture is configured to telescopically receive at least a portion of said engagement member to facilitate locking of said head relative to said handle.

18. The temperature sensing utensil according to claim 16 wherein said at least two opposing walls each include at least one aperture, each configured to accept at least a portion of a respective aligned one of said engagement members to facilitate locking of said head onto said handle.

19. The temperature sensing utensil according to claim 16 wherein said receiving region includes at least two sets of opposing walls at least partially defining said retaining region.

20. A utensil for sensing the temperature of food comprising:

a handle including an engagement region and a temperature indicating display assembly, said engagement region having at least one engagement member operably moveable between locking and release orientations, and a head which is both attachable to and detachable from the handle, said head including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit, said engagement member further including at least one of an engagement key and an engagement slot, said receiving member including the other of said engagement key and said engagement slot, such that said at least one engagement key matingly engages said at least one engagement slot to facilitate attachment of said head to said handle, while controlling the connection orientation of said electrical circuit to preserve uniform polarity.

21. A utensil for sensing the temperature of food comprising:

a handle including an engagement region and a temperature indicating display assembly, said engagement region having at least one engagement member operably moveable between locking and release orientations; and a head which is both attachable to and detachable from the handle, said head including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures said head to said handle, while maintaining an electrical connection circuit therebetween, and whereby moving said engagement member to a release orientation permits detachment of the head from said handle and simultaneous disconnection of said electrical circuit, said engagement member biased to said locking orientation.

* * * * *